(12) United States Patent
Min et al.

(10) Patent No.: US 10,189,549 B2
(45) Date of Patent: Jan. 29, 2019

(54) RENEWABLE POWER GENERATION FARM FOR FISHING WORK

(71) Applicants: Seunggi Min, Seoul (KR); Junggi Min, Seoul (KR)

(72) Inventors: Seunggi Min, Seoul (KR); Junggi Min, Seoul (KR)

( * ) Notice: Subject to any disclaimer, the term of this patent is extended or adjusted under 35 U.S.C. 154(b) by 0 days.

(21) Appl. No.: 15/538,677

(22) PCT Filed: Jan. 20, 2016

(86) PCT No.: PCT/KR2016/000562
§ 371 (c)(1),
(2) Date: Jun. 22, 2017

(87) PCT Pub. No.: WO2016/105179
PCT Pub. Date: Jun. 30, 2016

(65) Prior Publication Data
US 2017/0355426 A1 Dec. 14, 2017

(30) Foreign Application Priority Data
Jan. 25, 2015 (KR) .......................... 10-2015-0011719

(51) Int. Cl.
*B63B 35/44* (2006.01)
*F03D 9/00* (2016.01)
(Continued)

(52) U.S. Cl.
CPC .............. *B63B 35/44* (2013.01); *B63B 1/125* (2013.01); *F03D 1/02* (2013.01); *F03D 3/00* (2013.01);
(Continued)

(58) Field of Classification Search
CPC .................................. B63B 35/44; H02S 10/12
(Continued)

(56) References Cited

U.S. PATENT DOCUMENTS

| 8,261,494 B2* | 9/2012 | Pierce Jones ..... E04F 15/02405 136/244 |
| 8,446,030 B2* | 5/2013 | Brown ...................... E02B 9/08 114/264 |

(Continued)

FOREIGN PATENT DOCUMENTS

| KR | 10-2008-0077579 A | 8/2008 |
| KR | 10-2012-0035811 A | 4/2012 |

(Continued)

*Primary Examiner* — Lars A Olson
*Assistant Examiner* — Jovon E Hayes
(74) *Attorney, Agent, or Firm* — KORUS Patent, LLC; Seong Il Jeong

(57) ABSTRACT

There is provided a renewable power generation farm for fishing work, the farm comprising: a plurality of mutually connected floating ships, wherein each ship is configured to generate an energy using solar and wind power, wherein each ship comprises: a main elongate floating structure; a wind-based energy generation device secured to the main elongate floating structure; a transverse beam extending perpendicularly to a longitudinal direction of the main structure; a longitudinal beam extending in a parallel manner to the longitudinal direction of the main structure; connection beams connecting both opposing ends of the transverse beam and both opposing ends of the longitudinal beam respectively; auxiliary pillars vertically extending through the both ends of the transverse beam and the longitudinal beam respectively; solar-based energy generation devices disposed at top ends of the auxiliary pillars respectively; and auxiliary elongate floating structures disposed at bottom ends of the auxiliary pillars passing through the ends of the transverse beam.

5 Claims, 16 Drawing Sheets

(51) Int. Cl.
  *F03D 9/11*   (2016.01)
  *F03D 13/25*  (2016.01)
  *F03D 1/02*   (2006.01)
  *F03D 3/00*   (2006.01)
  *H02S 10/12*  (2014.01)
  *H02S 20/00*  (2014.01)
  *B63B 1/12*   (2006.01)
  *F24S 20/70*  (2018.01)
  *E02B 17/00*  (2006.01)
  *B63B 3/08*   (2006.01)

(52) U.S. Cl.
  CPC ............... *F03D 9/00* (2013.01); *F03D 9/007* (2013.01); *F03D 9/11* (2016.05); *F03D 13/25* (2016.05); *F24S 20/70* (2018.05); *H02S 10/12* (2014.12); *H02S 20/00* (2013.01); *B63B 2003/085* (2013.01); *B63B 2035/446* (2013.01); *B63B 2035/4453* (2013.01); *E02B 2017/0091* (2013.01); *F05B 2240/93* (2013.01); *F05B 2240/95* (2013.01); *Y02E 10/47* (2013.01); *Y02E 10/50* (2013.01); *Y02E 10/727* (2013.01); *Y02E 10/74* (2013.01)

(58) Field of Classification Search
  USPC ........................................................ 114/264
  See application file for complete search history.

(56)  References Cited

U.S. PATENT DOCUMENTS

2010/0095609 A1\*  4/2010  Kim ..................... F03D 3/065
                                                    52/173.3
2017/0355426 A1\*  12/2017 Min ..................... F03D 13/25

FOREIGN PATENT DOCUMENTS

| KR | 10-2013-0065044 A | 6/2013 |
| KR | 20130065044 A  *  | 6/2013 |
| KR | 10-1302055 B1     | 8/2013 |

\* cited by examiner

RENEWABLE POWER GENERATION FARM FOR FISHING WORK

BACKGROUND

Field of the Present Disclosure

The present invention relates to a renewable power generation farm for fishing work. More particularly, the present invention relates to a renewable power generation farm for fishing work configured to monitor illegal fishing on the sea surface surrounding the land, to enable the fishers to perform efficient fishing by residing in the fishery area, to provide new income via energy generation, and to provide a shelter against typhoon.

In general, illegal fishing in the offshore area nearby the peninsula is threatening the livelihood of fishermen. In addition, protection and surveillance of fisheries is required.

In addition, there is a risk of salinity on the sea level contacting the solar-based energy generation device, especially, in regions such as the Middle East region.

In addition, since the conventional offshore wind turbine generator is of a fixed type, it is almost impossible to monitor and protect the fishing area by using the conventional offshore wind turbine generator.

Discussion of Related Art

Most of the coastal areas nearby the peninsula are the intersections between the hot and cold sea water currents. These areas are areas where abundant aquatic products are produced. Due to the development of transport and maritime technology, illegal ship invasion from neighboring countries at distant distances into these areas is likely to occur.

Because of the depletion of fishery resources, these illegal ship invasions from neighboring countries are being monitored. Illegal fishing vessels are captured. Illegal fishing poses a threat to fishermen's livelihood. Fishermen may lose their fishing gear in the water. Fishing takes the initial preparation period, which is the prime time for crackdown of the illegal fishing. Therefore, it is necessary to monitor these illegal fishing using the energy generation floating ship.

Surveillance of the appearance of illegal fishing boats leads to patrolling the security guards or driving the aircraft. This causes an increase in the management cost.

Further, there is a demand for an electric power generation system capable of generating electric power by using infinite sunlight on the sea surface around the Middle East and Africa. There is also a demand for an electric power generation system capable of providing purified water In addition, reportedly, illegal immigration of African residents is being attempted into Europe. This is related to the demand for jobs. Therefore, development in Africa is necessary.

Therefore, aquatic products harvested by fishery work in the energy generation floating ship are to be used to expand collaboration in the community.

In addition, the energy generation floating ship is required which is easy to run on the sea by buoyancy, and is easy to be installed and managed on coastal area, and also, monitors the illegal fishing vessels.

The solar-based energy generation device installed at sea level is vulnerable to dirt and salt like yellow dust contained in sea breeze. In order to solve this problem, the present applicant has provided a solution in Korean Patent No. 10-1406894. Further, a wind power generator employing a vertical rotation drum is disclosed in Korean Patent Application No. 10-2010-0043991 filed by the present applicant.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The present disclosure is to provide the energy generation floating ship which is easy to run on the sea by buoyancy, and is easy to be installed and managed on coastal area, and also, monitors the illegal fishing vessels. The present disclosure is to provide the energy generation floating ship where the durability of the solar-based energy generation device are prevented from being weakened by corrosion due to sea breeze or salt, and the ship may also be used to condense and supply purified water.

The present disclosure is to provide a renewable power generation farm for fishing work wherein the energy generation floating ship may use the detection device to monitor illegal fishing operations.

The present disclosure is to provide a renewable power generation farm for fishing work wherein the plurality of the floating ships are connected in series to each other to allow the renewable power generation farm for fishing work to act as a defense floating barrier to protect the sea surface from illegal invasion.

The present disclosure is to provide a renewable power generation farm for fishing work wherein the electric power generated by the power generation apparatus is carried to the land, and this electric power is sold, leading to an increase in income.

In accordance with the present disclosure, there is provided a renewable power generation farm for fishing work floating on a sea surface 35, the farm comprising: a plurality of floating ships 70, wherein each ship is configured to generate an energy using solar and wind power.

In accordance with the present disclosure, each ship comprises: a main elongate floating structure 55 having a top face 51; a wind-based energy generation device 67 secured to the main elongate floating structure 55 via a vertical support pillar 63 fixed to a first point of the top face 51 of the main elongate floating structure 55; a transverse beam 48 extending perpendicularly to a longitudinal direction of the main elongate floating structure 55 and extending beyond lateral edges of the main elongate floating structure 55 while passing through the first point of the top face; a longitudinal beam 53 extending in a parallel manner to the longitudinal direction of the main elongate floating structure 55 and extending within the longitudinal length of the main elongate floating structure 55 while passing through the first point of the top face 51; connection beams 69 connecting both opposing first and second ends of the transverse beam 48 and both opposing first and second ends of the longitudinal beam 53 respectively; auxiliary pillars 61 vertically extending through the first and second ends of the transverse beam 48 and the first and second ends of the longitudinal beam 53 respectively; solar-based energy generation devices 50 disposed at top ends of the auxiliary pillars 61 respectively; auxiliary elongate floating structures 57 disposed at bottom ends of the auxiliary pillars 61 passing through the first and second ends of the transverse beam 48; and connectors 47 coupled to rear and front ends of the main elongate floating structure 55 respectively.

In one embodiment, the plurality of the floating ships are connected in series to each other via the connectors 47 to allow the renewable power generation farm for fishing work to act as a defense floating barrier 81 to protect the sea surface 35 from illegal invasion.

In one embodiment, the ship further comprises a cover 93 surrounding the solar-based energy generation device 50, wherein the cover 93 has a heated space 84 defined therein; an air outlet tube 97 and an air inlet tube 98 air-communicated with the heated space 84; an air discharge block 91 connected to the air outlet tube 97 and configured to discharge air using a pressure pump 84 into an evaporation region 85 defined in water 35, wherein the evaporation region 85 is defined by a jacket 88, wherein the pressure pump 84 is configured to blow air from the air discharge block 91 at a high pressure.

In one embodiment, the ship further comprises a salt-free air supply device 67 including:

the evaporation region 85 defined above the air discharge block 91; and a filtering unit 78 disposed above the evaporation region 85, wherein the salt-free air supply device 67 is configured to supply the salt-free air to the heated space 84 through the air inlet tube 72 connected to the filtering unit 78.

In one embodiment, the ship further comprises a detection device 88 provided at the upper end of each of the auxiliary pillars 63' to detect an illegally infiltrated ship and/or a position of the sun; and a rotator 59' disposed on an upper end of each of the auxiliary pillars 63' to rotate the solar-based energy generation device 50, wherein the orientation of the solar-based energy generation device 50 is adjusted through the rotator 59' based on the position of the detected sun, wherein each of the auxiliary elongate floating structures 57 includes a floating force generation body to act as a floating-force generation structure 46, wherein the floating-force generation structure 46 has a receiving space 77 for accommodating a battery 71 defined therein.

In one embodiment, the farm further comprises an inclined condensation unit 83 disposed in an region d below the filtering unit 78; and a water storage vessel 86 connected to a flow channel 94 for storing the condensed water from the condensation unit 83.

In one embodiment, the farm further comprises an air discharge rod 79 having a plurality of discharge holes defined therein; and a second salt-free air supply device 67' adjacent to the salt-free air supply device 67, wherein the air outlet tube 97 of the salt-free air supply device 67 and an air outlet tube 97' of the second salt-free air supply device 67' are connected to each other, wherein through a connector pipe 99, the evaporation region 85 of the salt-free air supply device 67 is connected to a filtering unit 78' of the second salt-free air supply device 67'.

In one embodiment, the farm further comprises a vertical propeller type wind power generator 76 provided at the upper end of each of the auxiliary pillars 61, wherein the vertical propeller type wind power generator 76 includes a rotation drum 59 having a fixed flange 58 at each of the upper and lower ends thereof, and inclined rotary vanes 54 provided on an outer surface of the rotation drum 59. In one embodiment, the connection beams 69 together forms a rhombus shape, wherein the transverse beam 48 is longer than the longitudinal beam 53, wherein the auxiliary elongate floating structure 57 is embodied as a floating-force generation body 64 that has a sealed void space defined therein or is filled with a foam; wherein the mutually coupled connection bars 4 is reinforced in terms of the coupling force therebetween using a chain 49.

In one embodiment, the farm further comprises an electrical charging unit 77 disposed on the main elongate floating structure 55 to charge a battery; and a battery-carrying ship 75 to carry the charged battery.

In one embodiment, the wind-based energy generation device is disposed between the solar-based energy generation device and the top face of the structure 55, wherein the wind-based energy generation device includes a rotation drum 38 through which the support pillar 63 passes, and blades 42 outwardly extending from the rotation drum 38, wherein the rotation drum 38 includes: a vertical rotatable body 37 with a hollow central region through which the support pillar 63 pass; upper and lower fixing flanges 58 extending horizontally outwardly from upper and lower ends of the vertical rotatable body 37 respectively; and spaced inclined portions 36 protruding outwardly from an outer surface of the vertical rotatable body 37 between the upper and lower flanges 58.

In one embodiment, the blades 42 are arranged in a circumferential direction at predetermined equal intervals, and each blade 42 is embodied as a curved plate 43, and a wind guide space 41 is defined between adjacent blades 42, wherein the ship further comprises: a further transverse beam 48' corresponding to the transverse beam 48', wherein the further transverse beam 48' is disposed between the rotation drum and the solar-based energy generation device; a further longitudinal beam 53' corresponding to the longitudinal beam 53', wherein the further beam 53' is disposed between the rotation drum and the solar-based energy generation device; and further connection beams 69' respectively corresponding to the connection beams 69, wherein the further connection beam 69' is disposed between the rotation drum and the solar-based energy generation device.

In accordance with the present disclosure, the energy generation floating ship is easy to run on the sea by buoyancy, and is easy to be installed and managed on coastal area, and also, monitors the illegal fishing vessels. The durability of the solar-based energy generation device are prevented from being weakened by corrosion due to sea breeze or salt, and the ship may also be used to condense and supply purified water.

In accordance with the present disclosure, the energy generation floating ship may use the detection device to monitor illegal fishing operations. The floating ships are connected in series to each other to allow the renewable power generation farm for fishing work to act as a defense floating barrier to protect the sea surface from illegal invasion.

In accordance with the present disclosure, the electric power generated by the power generation apparatus is carried to the land, and this electric power is sold, leading to an increase in income. A renewable power generation farm for fishing work may serve as a shelter to avoid typhoons and strong winds.

In accordance with the present disclosure, the present renewable power generation farm for fishing work is superior in practicality and economy compared to the conventional fixed type wind power or solar power generation equipment.

DETAILED DESCRIPTION

The present invention relates to a renewable power generation farm for fishing work. More particularly, the present invention relates to a renewable power generation farm for fishing work configured to monitor illegal fishing on the sea surface surrounding the land, to enable the fishers to perform efficient fishing by residing in the fishery area, to provide new income via energy generation, and to provide a shelter against typhoon.

More particularly, the present invention relates to a renewable power generation farm for fishing work configured to enhance the durability against the sea breeze of the solar photovoltaic panel installed on the sea, to filter the seawater for the living water, and contribute to the surveillance and protection activities of the sea.

In general, there is no adequate measure against illegal fishing boats that invade for catching fish at adjacent sea. Because of this, livelihood of fishermen is threatened.

In addition, there is not an adequate resident system in the fishery on which fishermen can continue to reside to do fishing. Therefore, fishermen must depart from the land port via fishing boat and return to the land port after fishing.

Hereinafter, a renewable power generation farm for fishing work according to the present invention will be described in detail on the basis of the accompanying drawings, which show the most preferred embodiments of the farm for construction in the field.

Figure 1:
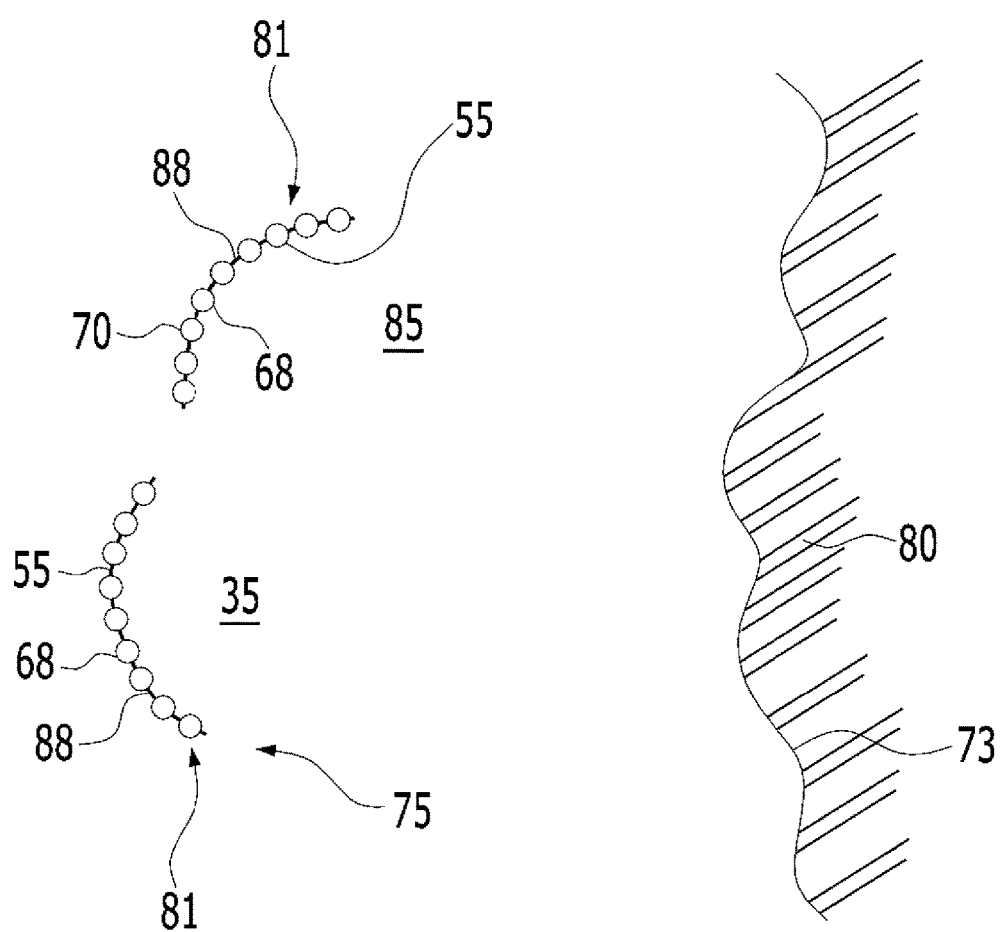
FIG. 1 is a schematic view of a renewable power generation farm for fishing work in accordance with one embodiment of the present disclosure.
Figure 2:
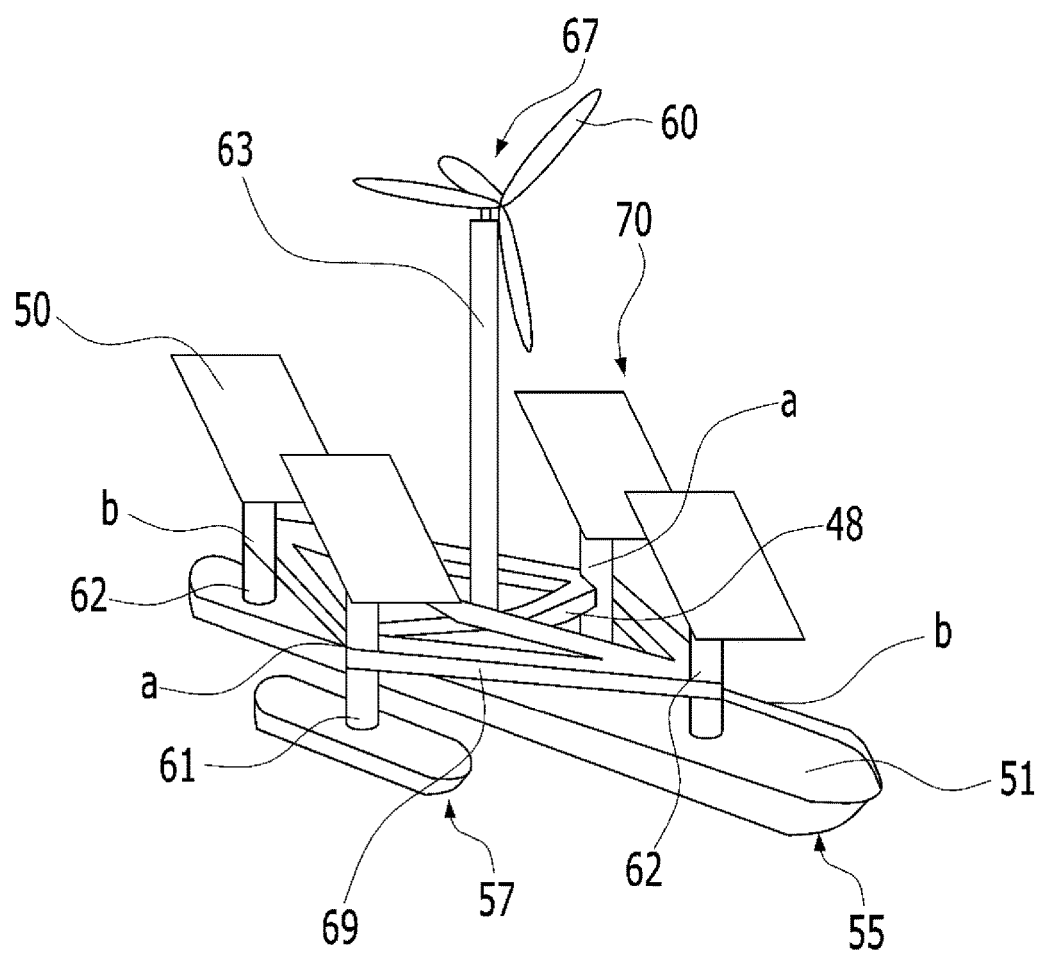
FIG. 2 is a perspective view of a floating ship configured for energy generation in accordance with one embodiment of the present disclosure.
Figure 3:
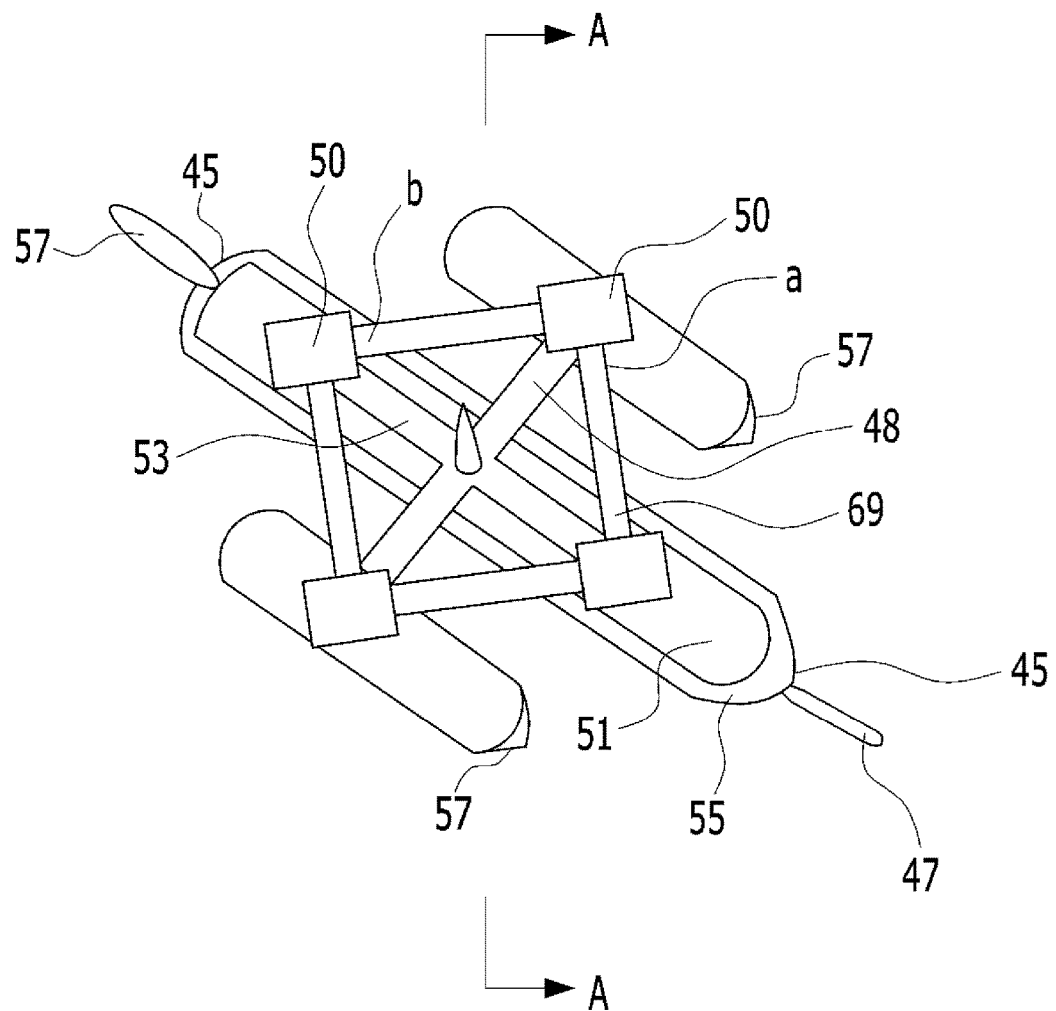
FIG. 3 is a top view of a floating ship configured for energy generation in accordance with one embodiment of the present disclosure.
Figure 4:
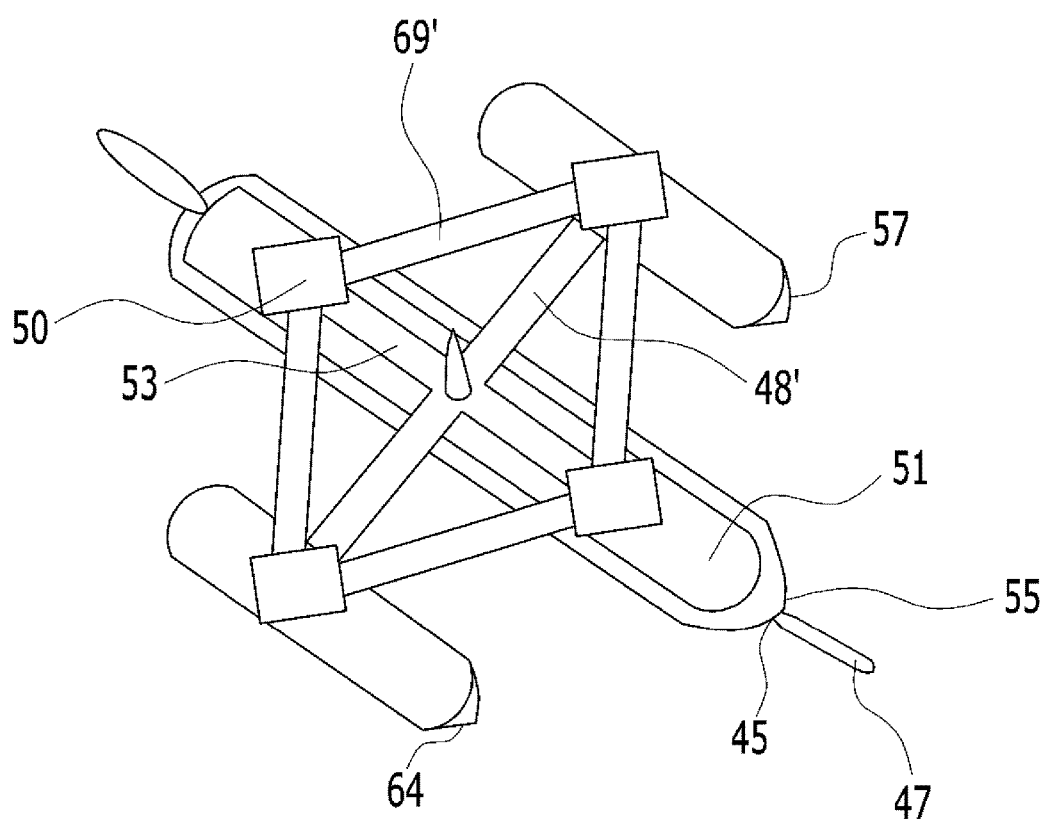
FIG. 4 is a top view of a floating ship configured for energy generation in accordance with another embodiment of the present disclosure.
Figure 5:
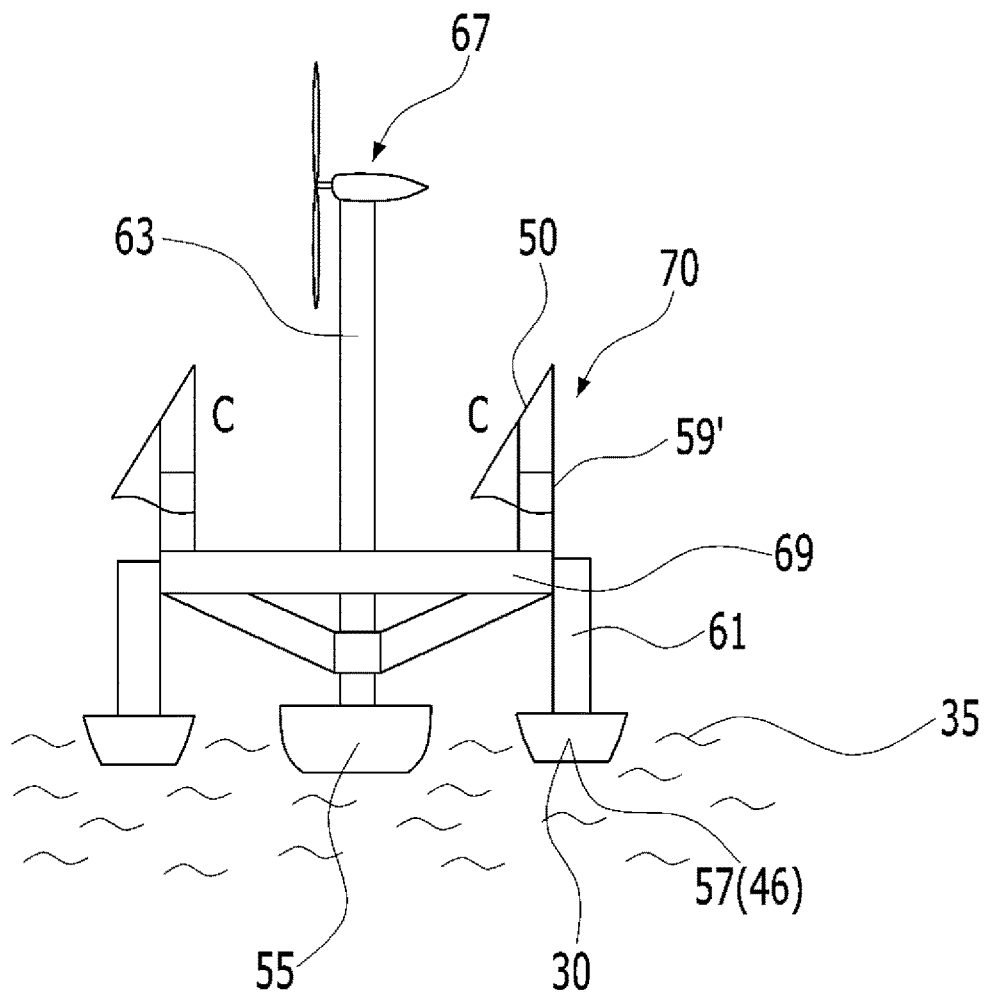
FIG. 5 is a side elevation view of a floating ship configured for energy generation in accordance with one embodiment of the present disclosure.

FIG. 1 is a schematic view of a renewable power generation farm for fishing work in accordance with one embodiment of the present disclosure. FIG. 2 is a perspective view of a floating ship configured for energy generation in accordance with one embodiment of the present disclosure. FIG. 3 is a top view of a floating ship configured for energy generation in accordance with one embodiment of the present disclosure. FIG. 4 is a top view of a floating ship configured for energy generation in accordance with another embodiment of the present disclosure. FIG. 5 is a side elevation view of a floating ship configured for energy generation in accordance with one embodiment of the present disclosure.

Figure 6:
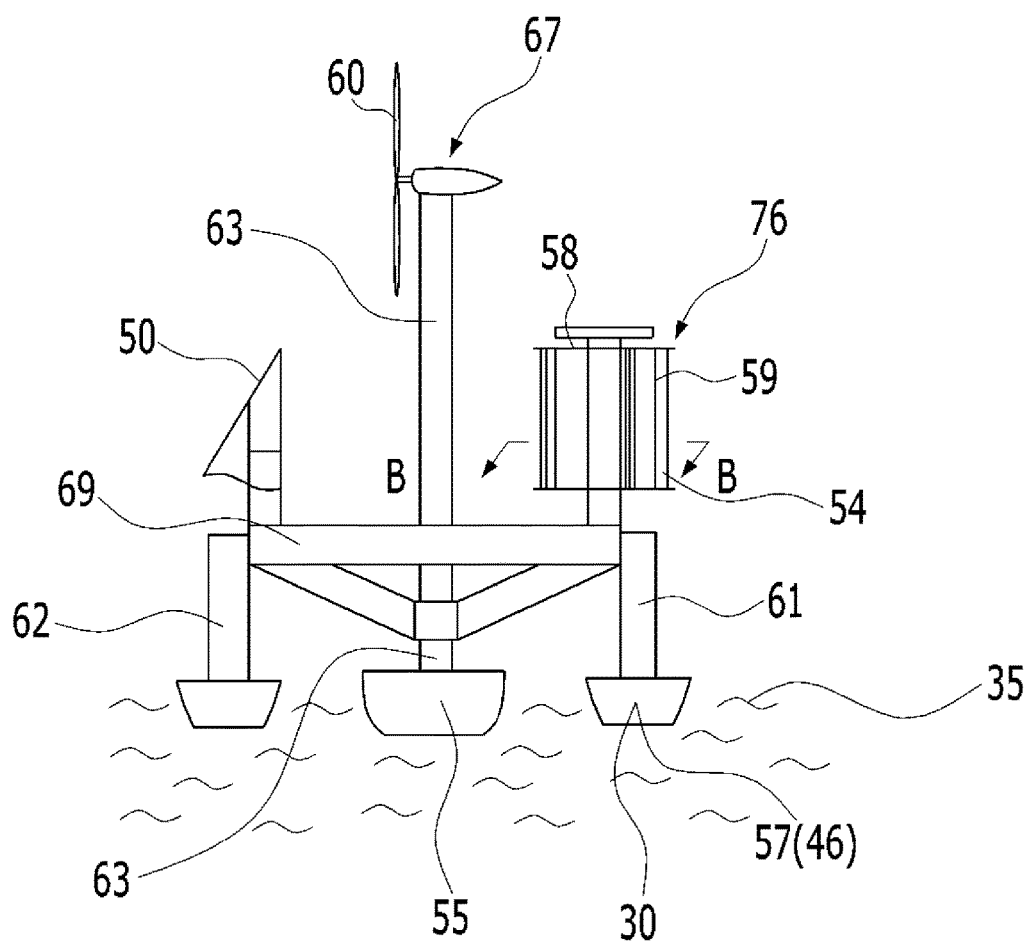
FIG. 6 is a side elevation view of a floating ship configured for energy generation in accordance with another embodiment of the present disclosure.
Figure 7:
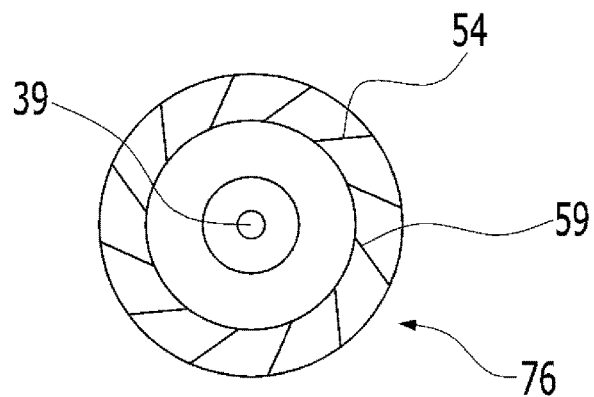
FIG. 7 is a top view of a wind-based energy generation device in accordance with one embodiment of the present disclosure.
Figure 8:
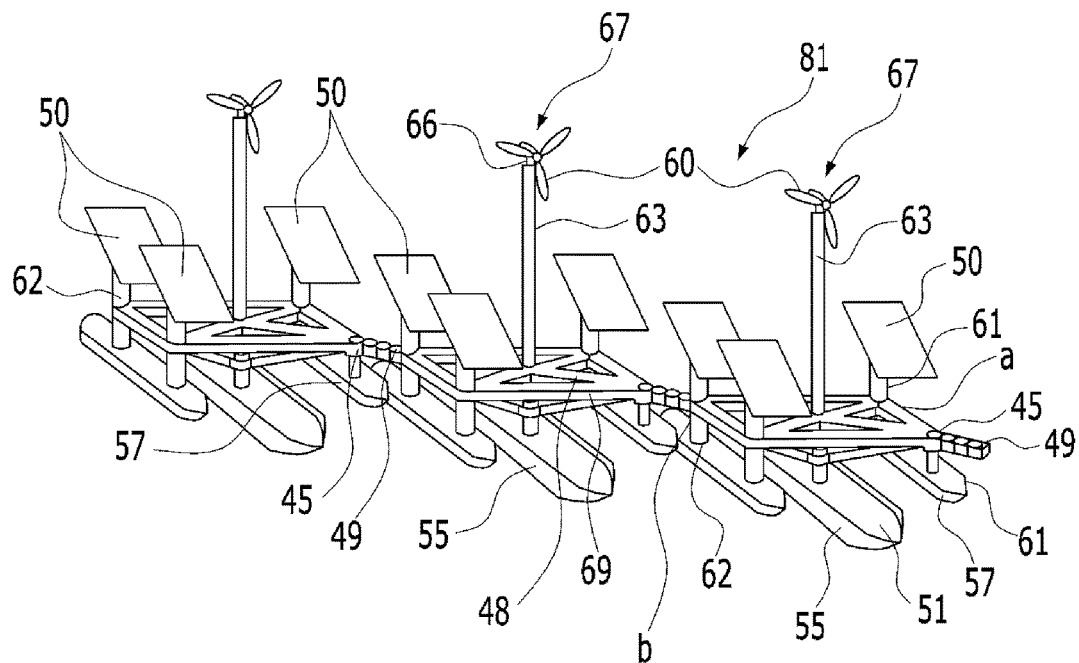
FIG. 8 is a perspective view of a renewable power generation farm for fishing work in accordance with another embodiment of the present disclosure.
Figure 9:
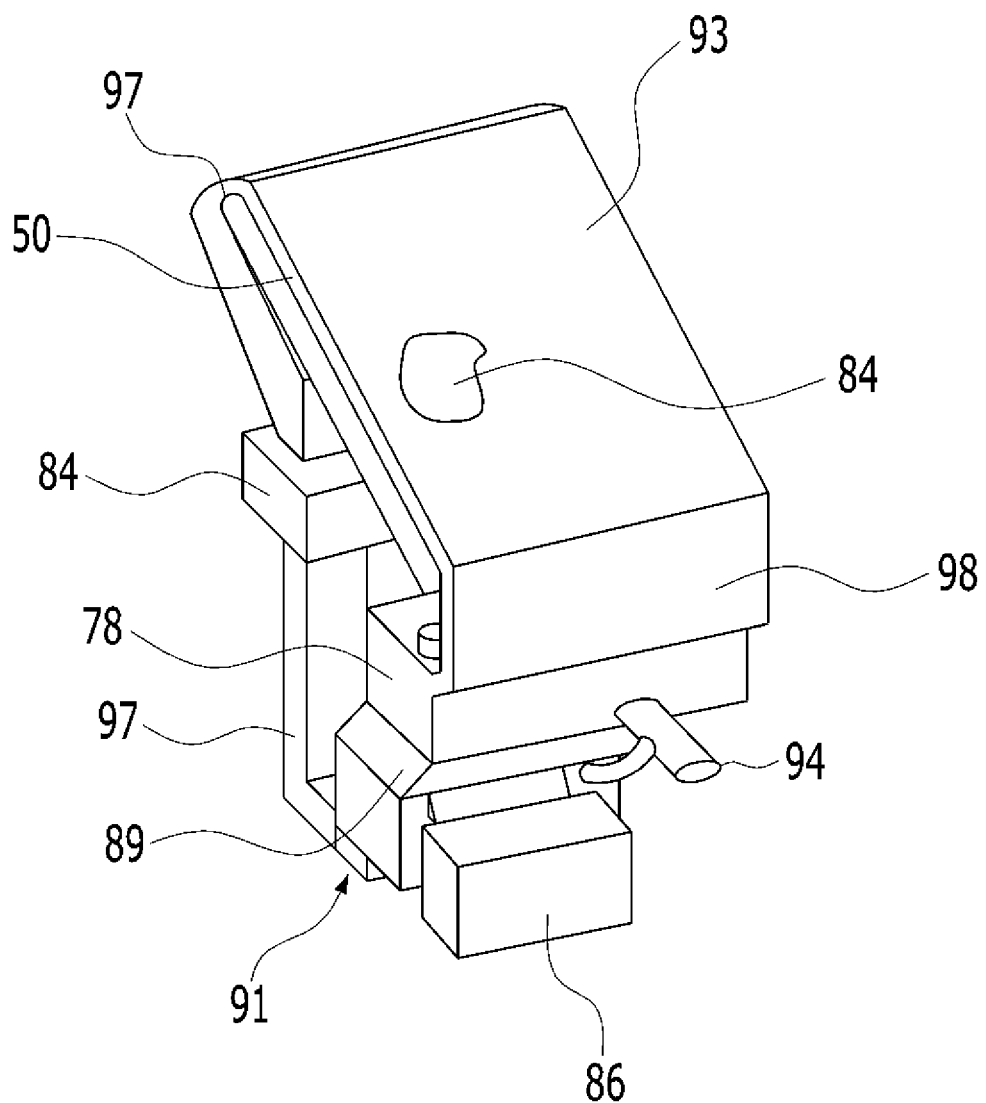
FIG. 9 is a perspective view of a solar-based energy generation device in accordance with one embodiment of the present disclosure.

FIG. 6 is a side elevation view of a floating ship configured for energy generation in accordance with another embodiment of the present disclosure. FIG. 7 is a top view of a wind-based energy generation device in accordance with one embodiment of the present disclosure. FIG. 8 is a perspective view of a renewable power generation farm for fishing work in accordance with another embodiment of the present disclosure. FIG. 9 is a perspective view of a solar-based energy generation device in accordance with one embodiment of the present disclosure.

Figure 10:
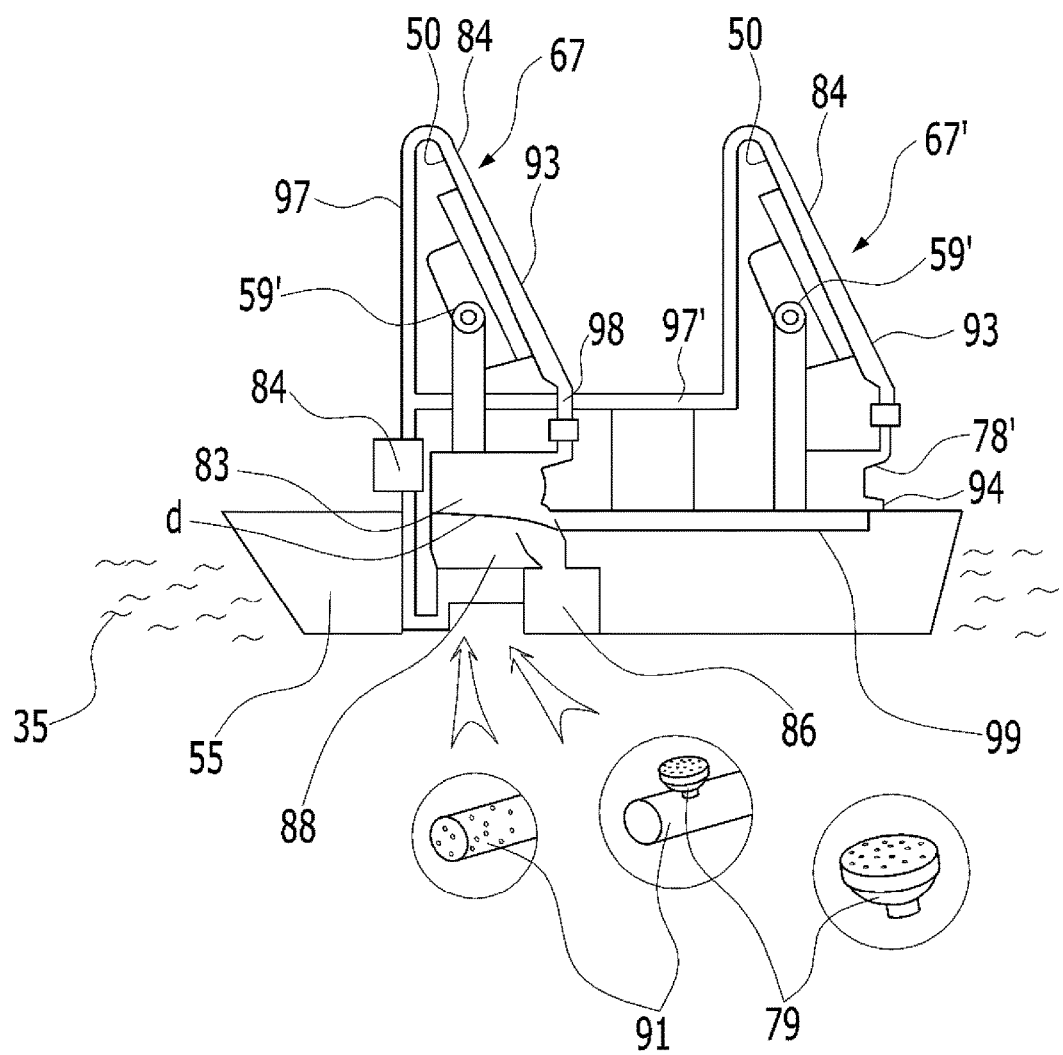
FIG. 10 is a side elevation view of a floating ship configured for energy generation in accordance with another embodiment of the present disclosure.
Figure 11:
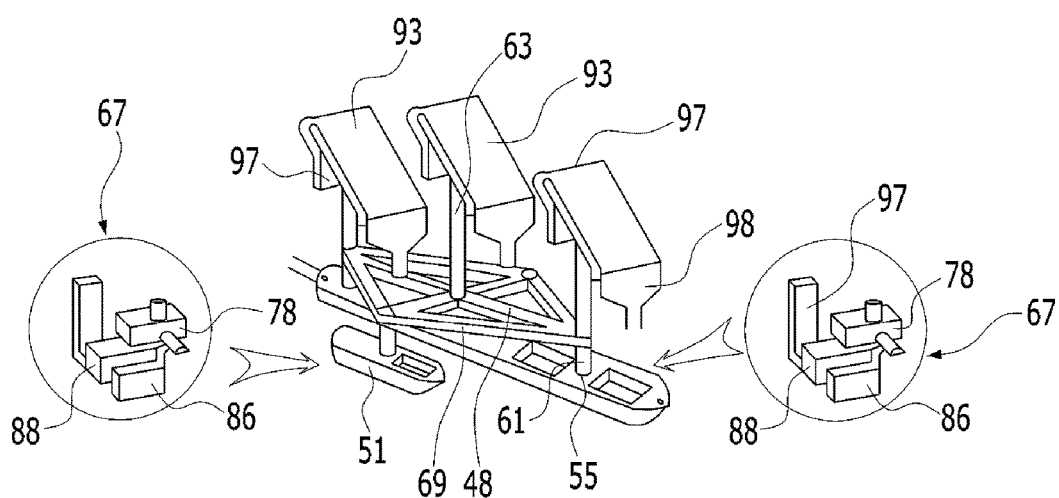
FIG. 11 is a perspective view of a floating ship configured for energy generation in accordance with still another embodiment of the present disclosure.
Figure 12:
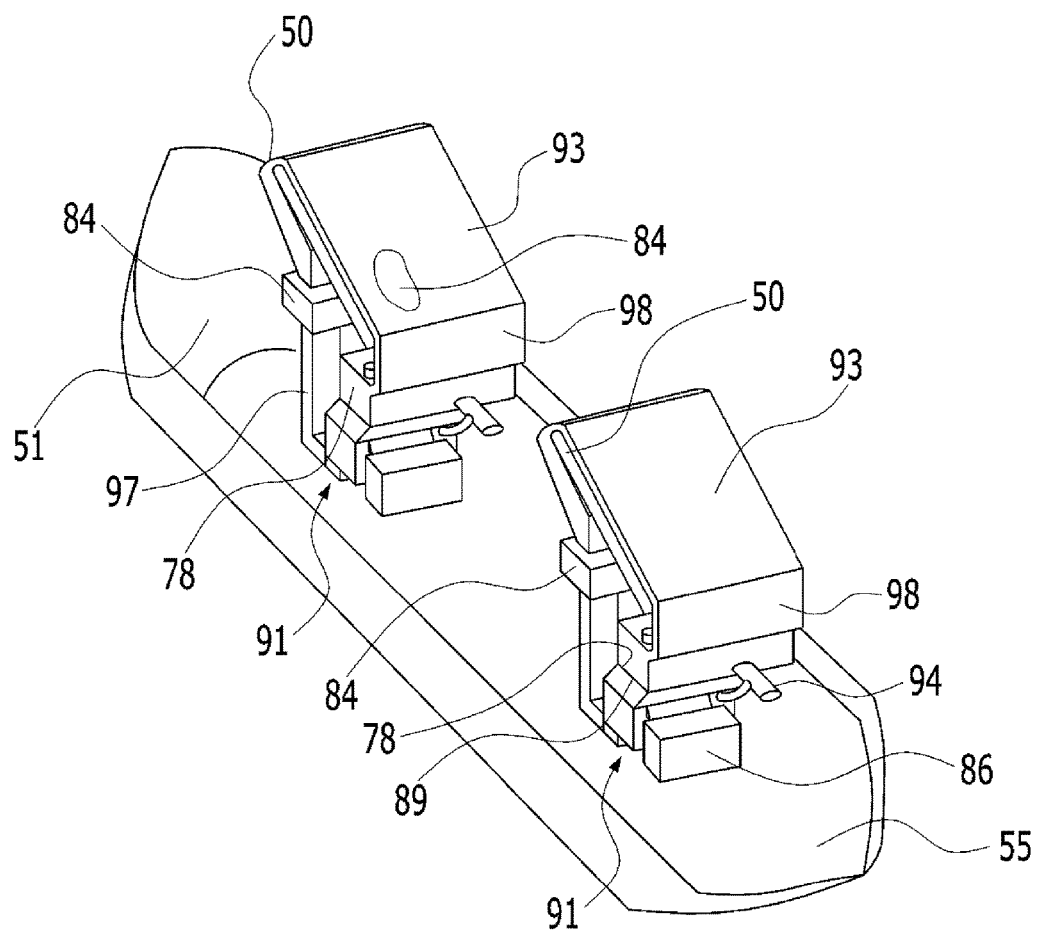
FIG. 12 is a perspective view of a solar-based energy generation device in accordance with another embodiment of the present disclosure.
Figure 13:
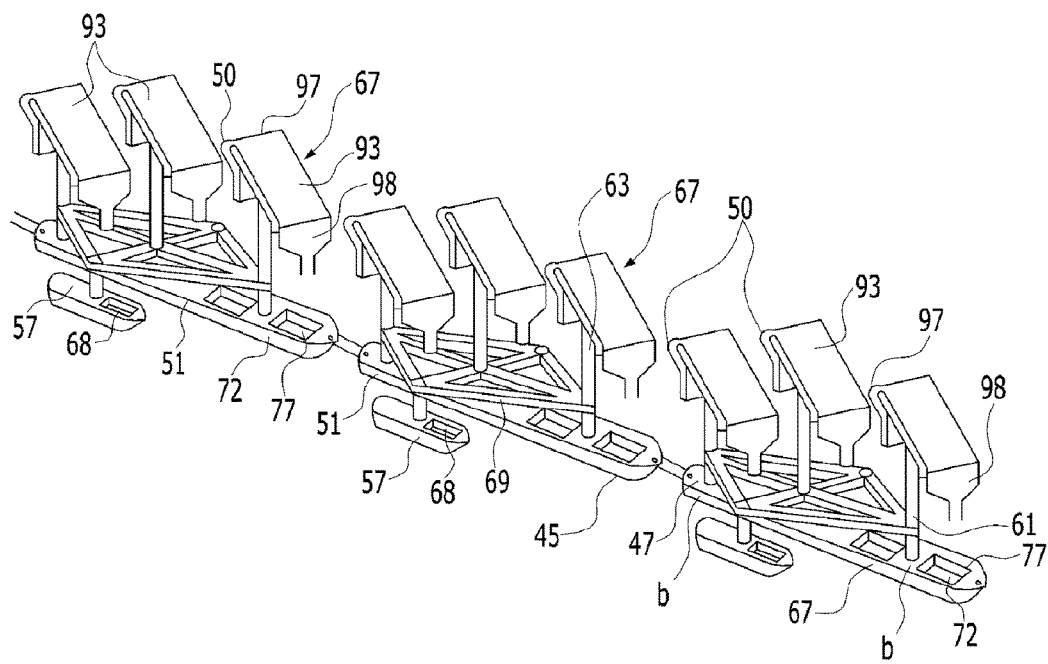
FIG. 13 is a perspective view of a renewable power generation farm for fishing work in accordance with still another embodiment of the present disclosure.
Figure 14:
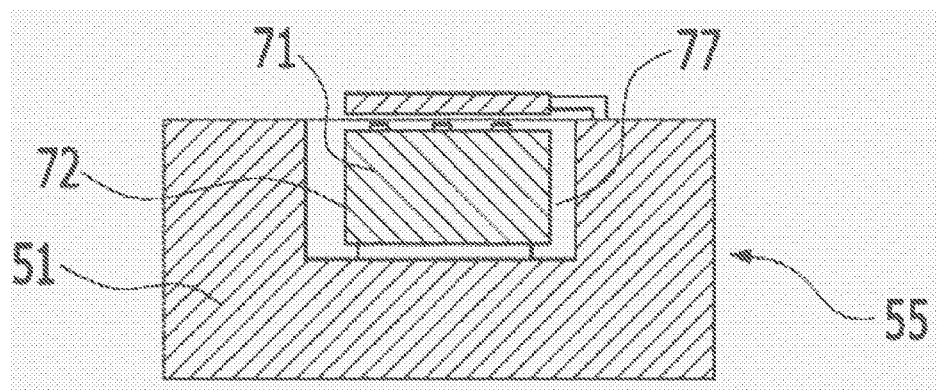
FIG. 14 is a side elevation view of an energy storage device in accordance with one embodiment of the present disclosure.
Figure 15:
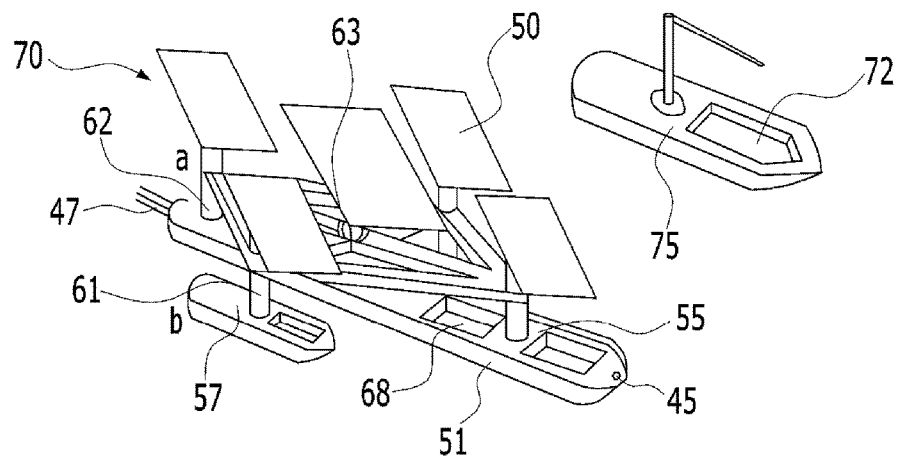
FIG. 15 is a perspective view of a floating ship configured for energy generation in accordance with still another embodiment of the present disclosure.
Figure 16:
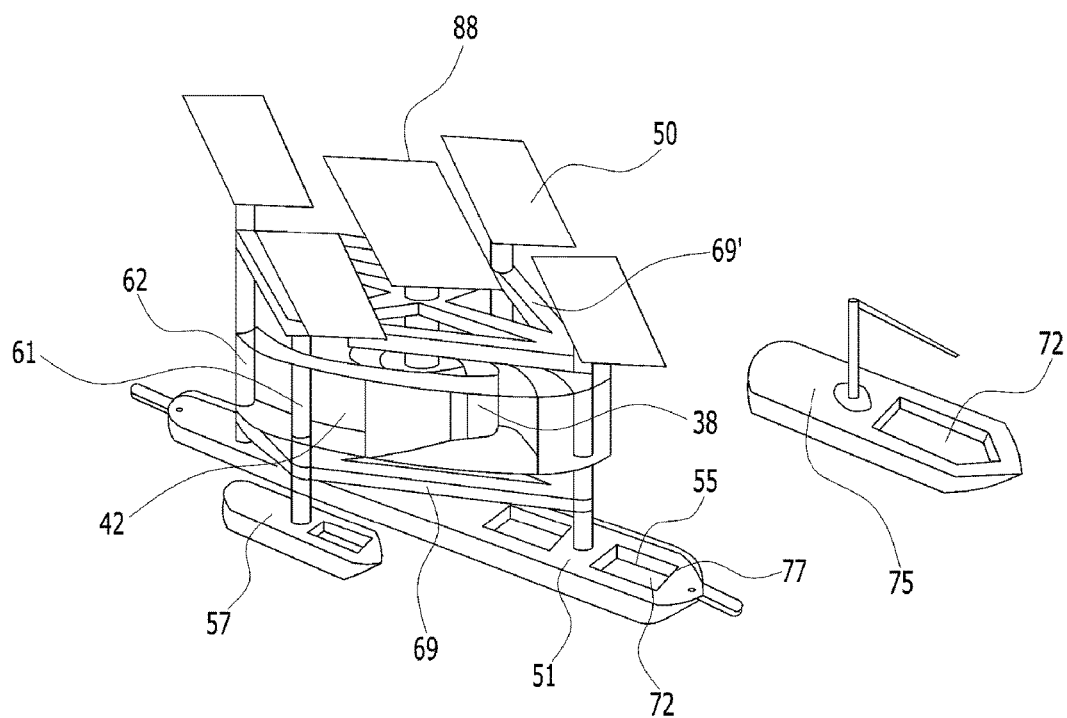
FIG. 16 is a perspective view of a floating ship configured for energy generation in accordance with still another embodiment of the present disclosure.

FIG. 10 is a side elevation view of a floating ship configured for energy generation in accordance with another embodiment of the present disclosure. FIG. 11 is a perspective view of a floating ship configured for energy generation in accordance with still another embodiment of the present disclosure. FIG. 12 is a perspective view of a solar-based energy generation device in accordance with another embodiment of the present disclosure. FIG. 13 is a perspective view of a renewable power generation farm for fishing work in accordance with still another embodiment of the present disclosure. FIG. 14 is a side elevation view of an energy storage device in accordance with one embodiment of the present disclosure. FIG. 15 is a perspective view of a floating ship configured for energy generation in accordance with still another embodiment of the present disclosure. FIG. 16 is a perspective view of a floating ship configured for energy generation in accordance with still another embodiment of the present disclosure.

Figure 17:
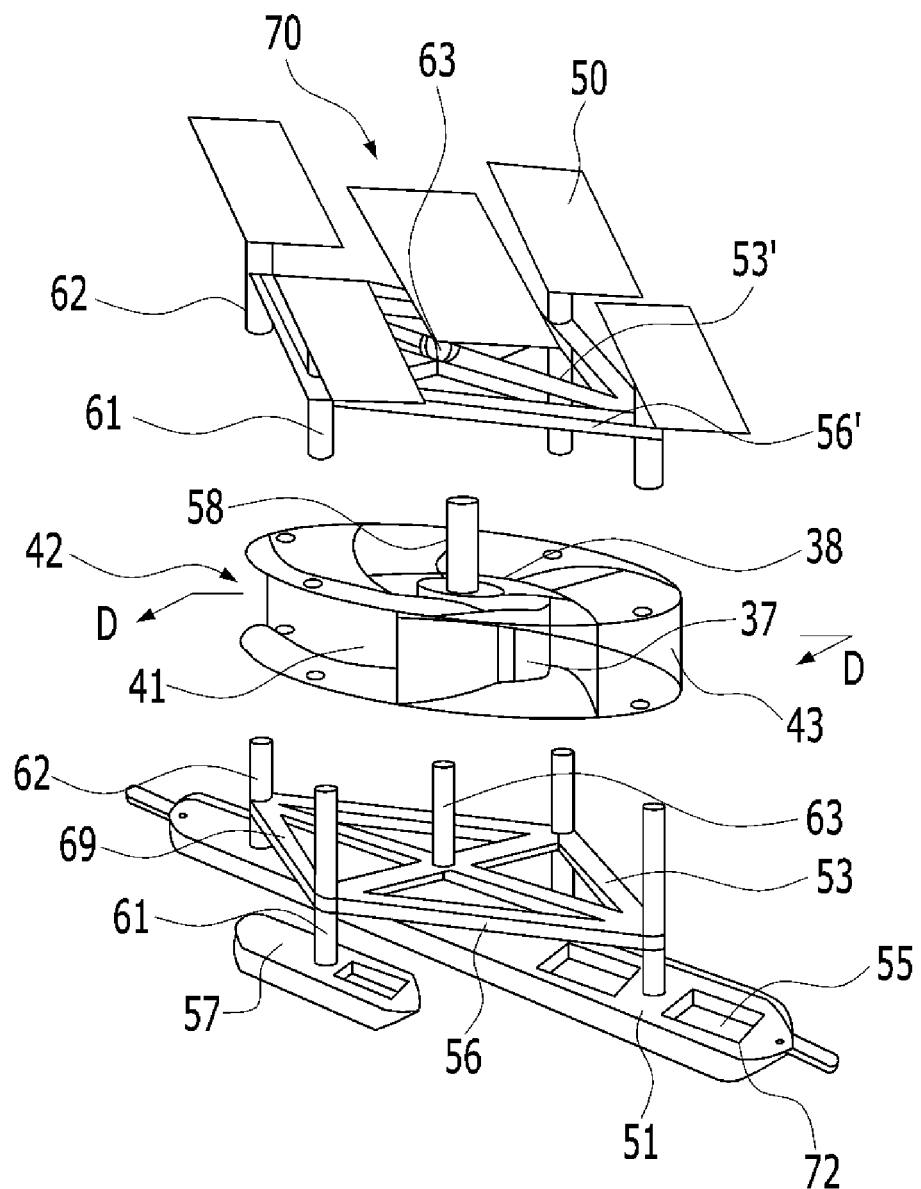
FIG. 17 is an exploded perspective view of a floating ship configured for energy generation in accordance with still another embodiment of the present disclosure.
Figure 18:
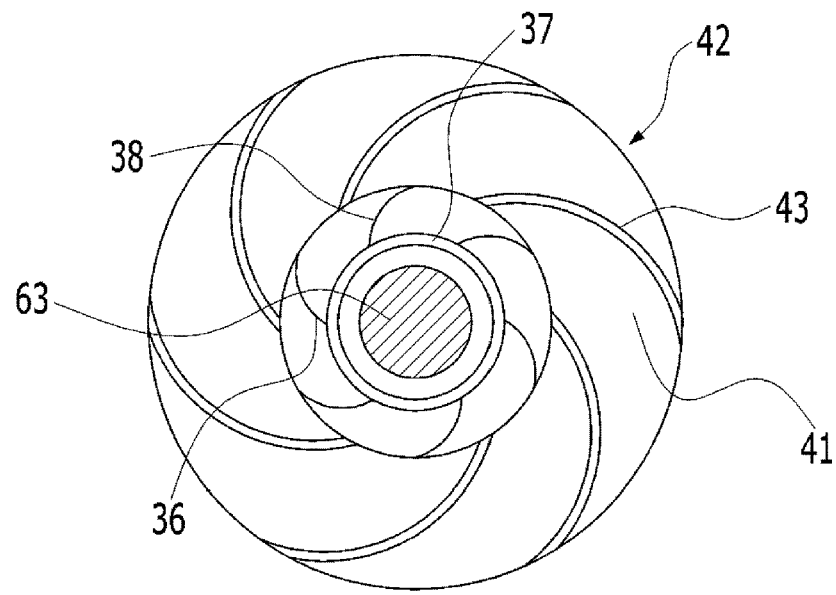
FIG. 18 is a top view of a wind-based energy generation device in accordance with another embodiment of the present disclosure.

FIG. 17 is an exploded perspective view of a floating ship configured for energy generation in accordance with still another embodiment of the present disclosure. FIG. 1 is a top view of a wind-based energy generation device in accordance with another embodiment of the present disclosure.

Figure 19:
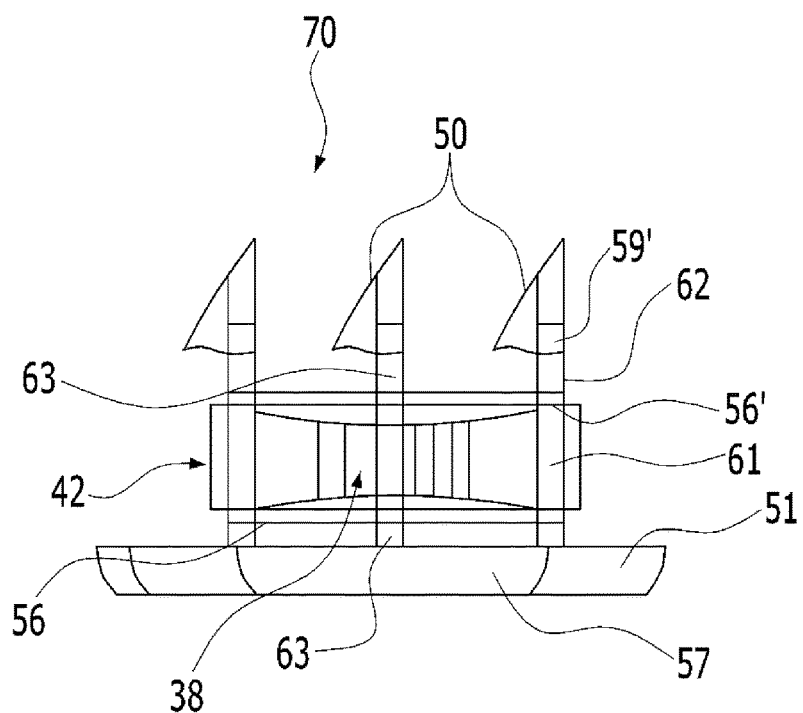
FIG. 19 is a side elevation view of a floating ship configured for energy generation in accordance with still another embodiment of the present disclosure.
Figure 20:
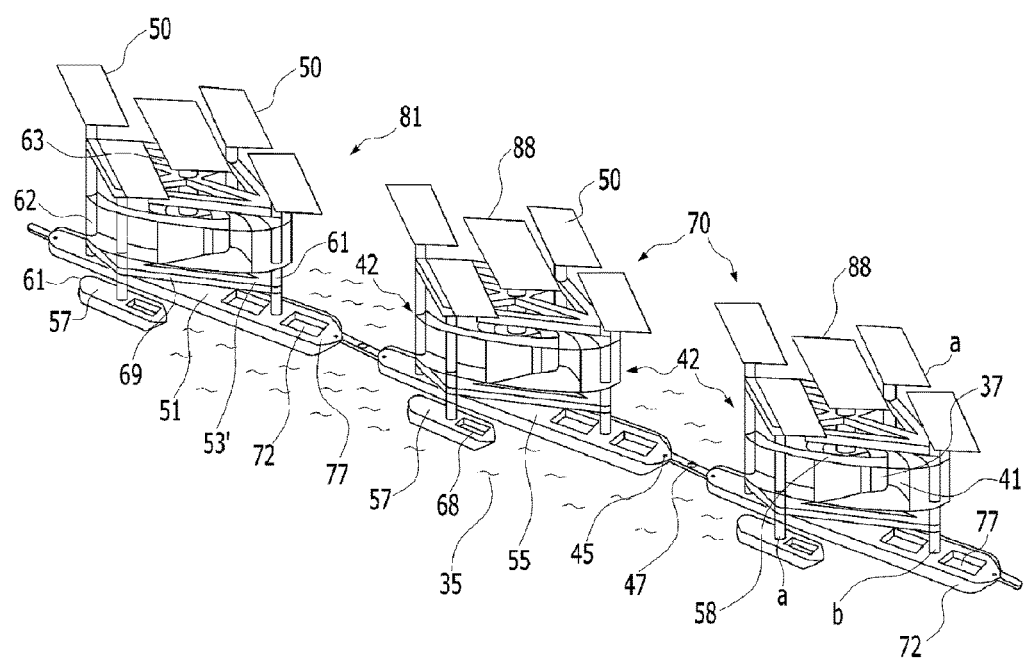
FIG. 20 is a perspective view of a renewable power generation farm for fishing work in accordance with still another embodiment of the present disclosure.

FIG. 19 is a side elevation view of a floating ship configured for energy generation in accordance with still another embodiment of the present disclosure. FIG. 20 is a perspective view of a renewable power generation farm for fishing work in accordance with still another embodiment of the present disclosure.

A wind-based energy generation device 67 is installed on a main elongate floating structure 55. Specifically, the wind-based energy generation device 67 is installed on the top face 51 of the main elongate floating structure 55 via a support pillar 63. Therefore, the wind-based energy generation device 67 is movable on the sea.

More particularly, the present invention relates to the renewable power generation farm for fishing work configured to monitor illegal fishing on the sea surface 35 surrounding the land, to enable the fishers to perform efficient fishing by residing in the fishery area using the main elongate floating structure 55, to provide new income via energy generation using the wind-based energy generation device 67 and to provide a shelter against typhoon using the main elongate floating structure 55.

Conventionally, the wind-based energy generation device 67 mainly uses the wind force generated from the sea surface 35. The wind-based energy generation device 67 is configured to generate power using the rotational force of the propeller 65. The wind-based energy generation device 67 stands depending on the buoyancy of the main elongate floating structure 55. Thus, when the main elongate floating structure 55 is severely tilted, the wind-based energy generation device 67 may sink.

A renewable power generation farm for fishing work floating on a sea surface 35 comprises a plurality of floating ships 70, wherein each ship is configured to generate an energy using solar and wind power. According to the present invention, in order to prevent such sinking, a floating ship 70 is constructed as follows. First, the wind-based energy generation device 67 is secured to the main elongate floating structure 55 through the support pillar 63 attached to the center of the top face 51 of the main elongate floating structure 55. A transverse beam 48 extends perpendicularly to the longitudinal direction of the main elongate floating structure 55 and extends beyond the lateral edges of the main elongate floating structure 55 while it passes through the center of the top face. A longitudinal beam 53 extends in a parallel manner to the longitudinal direction of the main elongate floating structure 55 and does not protrude beyond the lateral edges of the main elongate floating structure 55 while it passes through the center of the top face. Connection beams 69 connect the both opposing ends of the transverse beam 48 and the both opposing ends of the longitudinal beam 53. Therefore, there are four connection beams 69 in total. Each of the ends of the transverse beam 48 and the longitudinal beam 53 are provided with each of solar-based energy generation devices 50. Specifically, auxiliary pillars 61 are provided at both ends of the transverse beam 48 and at both ends of the longitudinal beam 53, respectively. The auxiliary pillars 61 vertically extend through the both ends of the transverse beam 48 and the both ends of the longitudinal beam 53, respectively. At the tops of the auxiliary pillars 61 are arranged the solar-based energy generation devices 50, respectively. Auxiliary elongate floating structures 57 are disposed at the lower ends of the auxiliary pillars 61 passing through the opposite ends of the transverse beam 48. Due to this configuration, sinking of the wind-based energy generation device 67 is prevented.

In the energy generation floating ship 70 according to the present invention, the auxiliary elongate floating structure 57 maintains balance of the main elongate floating structure 55. The lower ends of the auxiliary pillars 61 passing through the both ends of the longitudinal beam 53 respectively are fixed to the top face of the main elongate floating structure 55. Two solar-based energy generation devices 50 are installed at the upper end of the auxiliary pillars 61 passing through the opposite ends of the longitudinal beam 53, respectively. Further two solar-based energy generation devices 50 are installed at the top of the auxiliary pillars 61 through the opposite ends of the transverse beam 48, respectively. Due to this configuration, the solar-based energy generation devices 50 and the wind-based energy generation device 67 can be stably maintained on the energy generation floating ship 70 while performing sustainable power generation even though the wave strikes strongly the ship 70.

In this connection, each connection bar 47 is connected via each connection ring 45 to each of the front end and the rear end of the main elongated floating structure 55 of the energy generation floating ship 70. Thus, the plurality of the energy generation floating ships 70 are connected in series in a chain manner to each other via the connection bars 47 to form one defense floating barrier 81. This prevents illegal penetration and fishing.

In this connection, the energy generation floating ship 70 has a detection device 88 in the configuration shown in FIG. 16. The detection device 88 may be connected to the main elongate floating structure 55. The detection device 88 is configured monitor the fishing area 85 or a fishing equipment 68 installed in this fishing area.

The solar-based energy generation device 50 secured to the top face 51 of the main elongate floating structure 55 floated on the sea surface 35 is exposed to the outside. Accordingly, the solar-based energy generation device 50 is weakened in its durability due to the sea breeze blowing from the sea or the contact with the salt in the seawater.

Further, particularly during a hot summer, the solar-based energy generation device 50 may be heated to an average temperature of 60 to 70 degrees Celsius.

In this connection, the air containing water vapor is filtered many times, and the filtered air is supplied to the heating section of a cover surrounding the solar-based energy generation device.

In this connection, during the process of filtering the air containing water vapor several times, condensed water is generated below the filtering section, and the generated water is stored in a separate vessel. This configuration will be described with reference to FIG. 9 to FIG. 13.

A cover 93 surrounds the solar-based energy generation device 50 to fit the size of the solar-based energy generation device 50. The cover 93 has a heated space 84 defined therein. An air outlet tube 97 and air inlet tube 98 are configured to achieve the movement of the air to be cooled slowly between the top and bottom portion of the cover 93. The air outlet tube 97 is connected to an air discharge block 91 submerged in an evaporation region 85 defined in water 35. A pressure pump 84 is configured to blow air from the air discharge block 91 at a high pressure. Thereby, high pressure air is injected into the water 35 in the evaporation region 85. To this end, the air discharge block 91 is connected to an air discharge rod 79 having a plurality of discharge holes defined therein.

In this connection, a jacket 88 define the evaporation region 85. A filtering unit 78 is placed in the space where the seawater flows under the top face 57 of the main elongate floating structure 55. The jacket and the filtering unit 78 are connected to each other, so that the evaporation region 85 and the filtering unit 78 are connected to each other.

According to the present invention, a salt-free air supply device 67 includes the evaporation region 85, which is defined above the air discharge block 91, and the filtering unit 78, which is disposed above the evaporation region 85. The salt-free air supply device 67 supplies the decontaminated air to the heated space 84 through the air inlet tube 72 connected to the filtering unit 78.

According to the present invention, the solar-based energy generation device can be cooled. In other words, the salt contained in the seawater is filtered from air, and the filtered air is injected into the heated air generated from the solar-based energy generation device. In addition, during evaporation of water vapor, salinity is melted into the sea water and dust is filtered. As a result, desalinated and dust-free air is injected into the solar-based energy generation device to cool the solar-based energy generation device.

In this connection, the water vapor is further filtered using a filtering unit formed of a micro-porous body configured to filter the air containing water vapor. Thereby, the dehydrated pure air is supplied to the air inlet tube 98. This air is recirculated through the heating space defined in the cover 93 surrounding the solar-based energy generation device 50.

In this connection, the air inlet tube 98 is connected to a separately connected air supply pipe 94. Thereby, air further is supplied to the filtering unit 78. This replenishes the circulating air that is otherwise insufficient during operation of the device 67.

In another embodiment, the energy generation floating ship 70 is configured as follows.

The auxiliary elongate floating structures 57 are disposed at the lower ends of the auxiliary pillars 61 passing through the opposite ends of the transverse beam 48. Each of the auxiliary elongate floating structures 57 act as a floating-force generation structure 46 including a floating-force generation body 30. This suppresses a sink of the energy generation floating ship 70. The floating-force generation structure 46 may be provided with a fishing equipment 68. Thus, the energy generation floating ship 70 with the added economic benefits of providing renewable energy generation in addition to surveillance activities on the fishery is achieved.

To this end, the transverse beam 48 projects beyond the opposite lateral edges of the main elongate floating structure 55. The floating-force generation structures 46 are fixed to the both end of the transverse beam 48.

In addition, the detection device 88 provided at the upper end of each of the auxiliary pillars 63' monitors the illegally infiltrated ship. In addition, the detection device 88 can track the position of the sun. In addition, a rotator 59' is disposed on the upper end of the auxiliary pillars to rotate the solar-based energy generation device 50. Thereby, the orientation of the solar-based energy generation device 50 can be adjusted through the rotator 59' based on the position of the detected sun.

In accordance with another embodiment of the present invention, the floating-force generation structures 46 are fixed at the opposite ends of the transverse beam 48 that protrudes beyond the opposite lateral edges of the main elongated floating structure 55. The floating-force generation structure 46 may receive the battery 71. For this purpose, a receiving space 77 for accommodating the battery is formed. Such a receiving space may be used as a space for accommodating the fishes.

In this connection, a solar tracking device previously disclosed by the present applicant will be described.

The solar tracking device previously disclosed by the present applicant is disclosed in Korean Patent Application No. 2008-0096866 or U.S. Pat. No. 0,116,558. This solar tracking device can be applied to the energy generation floating ship 70 according to the present invention.

The energy generation floating ship 70 is capable of performing electric power generation while moving on a sea surface 35 along a wide space. Depending on the place of stay of the ship, sunlight may be strong and/or wind force may be strong. The type of the power generation device to be activated can be controlled according to the place of stay. Thus, efficient energy generation is possible.

In another embodiment of the present invention, a vertical propeller type wind power generator 76 may be provided at the upper end of each of the auxiliary pillars 61.

The vertical propeller type wind power generator 76 employs an idle space c under the rotating space of the rotating blades 60 coupled to the upper end of the support pillar 63.

Thereby, this provides a usability of the idle space c while balancing the ship 70 against the excessively biased wind force. The vertical propeller type wind power generator 76 is coupled via a rotating bearing mechanism to the upper end of the auxiliary pillar 61 passing through each of the both ends a of the connection beam 69.

The vertical propeller type wind power generator 76 includes a rotation drum 59 having a fixed flange 58 at each of the upper and lower ends thereof, and inclined rotary vanes 54 provided on an outer surface of the rotation drum 59.

In accordance with another embodiment as shown in FIG. 4, a floating ship 70 is constructed as follows. First, the wind-based energy generation device 67 is secured to the main elongate floating structure 55 through the support pillar 63 attached to the center of the top face 51 of the main elongate floating structure 55. A transverse beam 48 extends perpendicularly to the longitudinal direction of the main elongate floating structure 55 and extends beyond the lateral edges of the main elongate floating structure 55 while it passes through the center of the top face. A longitudinal beam 53 extends in a parallel manner to the longitudinal direction of the main elongate floating structure 55 and does not protrude beyond the lateral edges of the main elongate floating structure 55 while it passes through the center of the top face. Connection beams 69 connect the both opposing ends of the transverse beam 48 and the both opposing ends of the longitudinal beam 53. Therefore, there are four connection beams 69 in total. Each of the ends of the transverse beam 48 and the longitudinal beam 53 are provided with each of solar-based energy generation devices 50. Specifically, auxiliary pillars 61 are provided at both ends of the transverse beam 48 and at both ends of the longitudinal beam 53, respectively. The auxiliary pillars 61 vertically extend through the both ends of the transverse beam 48 and the both ends of the longitudinal beam 53, respectively. At the tops of the auxiliary pillars 61 are arranged the solar-based energy generation devices 50, respectively. Auxiliary elongate floating structures 57 are disposed at the lower ends of the auxiliary pillars 61 passing through the opposite ends of the transverse beam 48. Especially, in this embodiment, the four connection beams 69 together forms not a square shape but a rhombus shape. Thus, the transverse beam 48 is longer than the longitudinal beam 53. Thus, due to this configuration, the transverse stability of the ship 70 may be further improved and, thus, sinking of the wind-based energy generation device 67 is further prevented.

In the energy generation floating ship 70 according to the present invention, the four connection beams 69 together forms not a square shape but a rhombus shape, and, thus, the auxiliary elongate floating structure 57 maintains improved balance of the main elongate floating structure 55. Due to this configuration, the solar-based energy generation devices 50 and the wind-based energy generation device 67 may be further stably maintained on the energy generation floating ship 70 while performing sustainable power generation even though the wave strikes strongly the ship 70.

According to one embodiment of the present invention, the auxiliary elongate floating structure 57 may be embodied as a floating-force generation body 64 that has a sealed void space defined therein or is filled with a foam. This allows for more stable buoyancy on the sea surface.

According to one embodiment of the present invention, there is a plurality of floating generation ships 70. The plurality of energy generation floating ships 70 may be connected to each other in series in a chain fashion to form a single defense floating barrier 81. That is, a plurality of the energy generation floating ships 70 may be connected to each other via the connection bars 47 fixed to the front end and the rear end of each main elongate floating structure 55. The connection bars 47 are connected via the connection ring 45.

The plurality of energy generation floating ships 70 may be connected to each other in series in a chain fashion to form a single defense floating barrier 81 with a predetermined length. When the plurality of the energy generation floating ships 70 may be connected to each other via the connection bars 47, the coupled connection bars 47 may be reinforced in terms of the coupling force thereof using a chain 49 as shown in FIG. 8.

As shown in FIG. 8, in one embodiment of the present invention, a further auxiliary pillar 61 extends vertically from a portion of the main elongate floating structure 55 adjacent to the connection bar 47. The solar-based energy generation device 50 is connected to the upper end of the further auxiliary pillar 61. In particular, such a solar-based energy generation device 50 is installed only in one of the front and rear sides. This is to facilitate movement in the direction of the curve during travel of the ship.

In this connection, the inclination of the solar-based energy generation device 50 allows the wind to be directed to the rotation drum 59 of the wind-based energy generation device 67. Thus, wind power can be efficiently used.

In order to improve the practicality of the energy generation floating ship 70 according to the present invention, the energy generation floating ship 70 may be used in desertification areas in the Middle East or Africa. In these areas, sunlight is shining almost continuously throughout the year.

Land 80 in the desertification area is too dry. The sunshine in these areas is not effectively used for the renewable energy generation.

According to one embodiment of the present invention, as shown in FIGS. 9 to 13, the practicality of the energy generation floating ship 70 in these areas may be improved. In this embodiment, a cover 93 surrounds the solar-based energy generation device 50 to fit the size of the solar-based energy generation device 50. The cover 93 has a heated space 84 defined therein. An air outlet tube 97 and air inlet tube 98 are configured to achieve the movement of the air to be cooled slowly between the top and bottom portion of the cover 93. The air outlet tube 97 is connected to an air discharge block 91 submerged in an evaporation region 85 defined in water 35. A pressure pump 84 is configured to blow air from the air discharge block 91 at a high pressure. Thereby, high pressure air is injected into the water 35 in the evaporation region 85. To this end, the air discharge block 91 is connected to an air discharge rod 79 having a plurality of discharge holes defined therein. In this connection, a jacket 88 define the evaporation region 85. A filtering unit 78 is placed in the space where the seawater flows under the top face 57 of the main elongate floating structure 55. The jacket and the filtering unit 78 are connected to each other, so that the evaporation region 85 and the filtering unit 78 are connected to each other. According to the present invention, a salt-free air supply device 67 includes the evaporation region 85, which is defined above the air discharge block 91, and the filtering unit 78, which is disposed above the evaporation region 85. The salt-free air supply device 67 supplies the decontaminated air to the heated space 84 through the air inlet tube 72 connected to the filtering unit 78. In this connection, the water vapor is further filtered using a filtering unit formed of a micro-porous body configured to filter the air containing water vapor. Thereby, the dehydrated pure air is supplied to the air inlet tube 98. This air is recirculated through the heating space defined in the cover 93 surrounding the solar-based energy generation device 50. The heated air or water vapor flows from the air discharge rod 79 having a plurality of discharge holes defined therein to the evaporation region 85 via the sea water. During this flow of the air including water vapor, the dust or salt is removed from the air via the sea water. Then, the air or water vapor flows into a fine hole defined in a bottom of the filtering unit 78 disposed above the evaporation region 85. In this way, the water vapor may be condensed into water. The condensed water may flow toward a region d as shown in FIG. 10.

The condensed water may be stored in the water storage vessel 86. Thus, according to one embodiment of the present invention, as shown in FIGS. 9 to 13, the energy generation floating ship 70 acts to generate and supply purified water.

To this end, the energy generation floating ship 70 further comprises an inclined condensation unit 83 disposed in the region d below the filtering unit 78, and a water storage vessel 86 connected to a flow channel 94 for storing the condensed water from the condensation unit 83.

Adjacent to the salt-free air supply device 67, there is a second salt-free air supply device 67'. The air outlet tube 97 of the salt-free air supply device 67 and the air outlet tube 97' of the second salt-free air supply device 67' are connected to each other. Through a connector pipe 99, the evaporation region 85 of the salt-free air supply device 67 is connected to the filtering unit 78' of the second salt-free air supply device 67'.

In this connection, the solar-based energy generation device 50 is fixed to the upper end of the support pillar 63. At the upper end of the solar-based energy generation device 50, a detection device 88 for monitoring a fishery field 85 or an offshore area is installed.

Further, in the sea surface 35 adjacent to the desert area, for example, the land in the Middle East region, the wind force hardly exists throughout the year, but there is abundant sunlight. The energy generation floating ship, which is easy to move over the sea surface 35 and provides protection and monitoring for fisheries 85 and utilizes the abundant sunlight in these areas, is described with reference to FIG. 1 and FIGS. 11 to 14. As shown, the wind-based energy generation device 67 provided at the upper end of the support pillar 63 is coupled to the solar-based energy generation device 50. On the top face 51 of the main elongated floating structure 55, there is an electrical charging unit 77 for charging the battery 72. There is a separate battery-carrying ship 75 for carrying the charged battery from the electrical charging unit 77. This battery-carrying ship carries the battery to a terminal 73 on the land 80.

In addition, on the sea level 35, the sun shines depending on the location and season. Typhoons and strong winds may be blowing depending on the season.

The configuration using the Typhoons and strong winds may be feasible. To this end, the vertical propeller type wind power generator 76 is installed to the support pillar 63. The vertical propeller type wind power generator 76 includes a rotation drum 59 having a fixed flange 58 at each of the upper and lower ends thereof, and inclined rotary vanes 54 provided on an outer surface of the rotation drum 59.

However, the vertical propeller type wind power generator 76 is exposed to the outside. Therefore, the vertical propeller type wind power generator 76 may generate rotational noise. It may also be dangerous for management. In order to solve such a problem, according to an embodiment of the present invention, an arrangement for stably supplying the electrical power using sunlight and wind power may be realized as shown in FIG. 15 to FIG. 20 as attached hereto. In this embodiment, the wind-based energy generation device and the photovoltaic device may be physically stably coupled to each other.

In one embodiment, the wind-based energy generation device is disposed between the photovoltaic device and the top face of the structure 55. The wind-based energy generation device includes a rotation drum 38 through which the support pillar 63 passes, and blades 42 outwardly extending from the rotation drum 38.

In this connection, the blades 42 are rotated by wind force. In order to absorb rotational noise, the rotation drum 38 includes a vertical rotatable body 37 in contact with the support pillar 63, upper and lower fixing flanges 58 extending outwardly from the upper and lower ends of the vertical rotatable body 37 respectively, and spaced inclined portions 36 protruding outwardly from the outer surface of the vertical rotatable body 37 between the upper and lower flanges 58. The blades 42 are arranged in the circumferential direction at predetermined equal intervals. This blade is formed by a curved plate 43. A wind guide space 41 is defined between these blades.

In this connection, the ship 70 further comprises: a further transverse beam 48' corresponding to the transverse beam 48', wherein the further transverse beam 48' is disposed between the rotation drum and the solar-based energy generation device; a further longitudinal beam 53' corresponding to the longitudinal beam 53', wherein the further beam 53' is disposed between the rotation drum and the solar-based energy generation device; and further connection beams 69' respectively corresponding to the connection beams 69, wherein the further connection beam 69' is disposed between the rotation drum and the solar-based energy generation device.

The power generated from the energy generation floating ship 70 is charged into the battery. The electrical charging unit 77 for charging the battery 72 is provided on the main elongated floating structure 55. The charged battery is loaded on the battery-carrying ship 75 and transported to a terminal 73 on the land 80.

Examples of various embodiments have been illustrated and described above. It will be understood that the description herein is not intended to limit the claims to the specific embodiments described. On the contrary, it is intended to cover alternatives, modifications, and equivalents as may be included within the spirit and scope of the present disclosure as defined by the appended claims.

REFERENCE NUMERALS

30: floating-force generation body
35: sea surface
37: rotation body
38: rotation drum
41: curved plates
42: blades
45: connection ring
46: floating-force generation structure
47: connector bar
48: support beam
49: chain
50: solar-based energy generation device
51: top face
53: longitudinal beam
55: main elongate floating structure 55
56: frame
57: auxiliary elongate floating structures
59: rotation drum
61,62: auxiliary pillars
63: support pillar
69: connection beams
64: floating-force generation body
65: propeller
66: vertical propeller type wind power generator
67: salt-free air supply device
68: fishing equipment
70: energy generation floating ship
72: battery
73: terminal
75: battery-carrying ship
78: filtering unit
79: air discharge rod
81: defense barrier
84: heated space
85: evaporation region
86: water storage vessel
88: jacket
91: air discharge block
93: cover

What is claimed is:

1. A renewable power generation farm for fishing work floating on a sea surface, the farm comprising:
   a plurality of floating ships, wherein each ship is configured to generate an energy using solar and wind power, wherein each ship comprises:
   a main elongate floating structure having a top face;
   a wind-based energy generation device secured to the main elongate floating structure via a vertical support pillar fixed to a first point of the top face of the main elongate floating structure;
   a transverse beam extending perpendicularly to a longitudinal direction of the main elongate floating structure and extending beyond lateral edges of the main elongate floating structure while passing through the first point of the top face;
   a longitudinal beam extending in a parallel manner to the longitudinal direction of the main elongate floating structure and extending within the longitudinal length of the main elongate floating structure while passing through the first point of the top face;
   connection beams connecting both opposing first and second ends of the transverse beam and both opposing first and second ends of the longitudinal beam respectively;
   auxiliary pillars vertically extending through the first and second ends of the transverse beam and the first and second ends of the longitudinal beam respectively;
   solar-based energy generation devices disposed at top ends of the auxiliary pillars respectively;

auxiliary elongate floating structures disposed at bottom ends of the auxiliary pillars passing through the first and second ends of the transverse beam;
connectors coupled to rear and front ends of the main elongate floating structure respectively,
a cover surrounding the solar-based energy generation device, wherein the cover has a heated space defined therein;
an air outlet tube and an air inlet tube air-communicated with the heated space;
an air discharge block connected to the air outlet tube and configured to discharge air using a pressure pump into an evaporation region defined in water, wherein the evaporation region is defined by a jacket, wherein the pressure pump is configured to blow air from the air discharge block at a high pressure;
a salt-free air supply device including: the evaporation region defined above the air discharge block; and a filtering unit disposed above the evaporation region, wherein the salt-free air supply device is configured to supply the salt-free air to the heated space through the air inlet tube connected to the filtering unit;
a detection device provided at the upper end of each of the auxiliary pillars to detect an illegally infiltrated ship and/or a position of the sun; and
a rotator disposed on an upper end of each of the auxiliary pillars to rotate the solar-based energy generation device, wherein the orientation of the solar-based energy generation device is adjusted through the rotator based on the position of the detected sun,
wherein the plurality of the floating ships are connected in series to each other via the connectors to allow the renewable power generation farm for fishing work to act as a defense floating barrier to protect the sea surface from illegal invasion, and
wherein each of the auxiliary elongate floating structures includes a floating force generation body to act as a floating-force generation structure, wherein the floating-force generation structure has a receiving space for accommodating a battery defined therein.

2. A renewable power generation farm for fishing work floating on a sea surface, the farm comprising:
a plurality of floating ships, wherein each ship is configured to generate an energy using solar and wind power, wherein each ship comprises:
a main elongate floating structure having a top face;
a wind-based energy generation device secured to the main elongate floating structure via a vertical support pillar fixed to a first point of the top face of the main elongate floating structure;
a transverse beam extending perpendicularly to a longitudinal direction of the main elongate floating structure and extending beyond lateral edges of the main elongate floating structure while passing through the first point of the top face;
a longitudinal beam extending in a parallel manner to the longitudinal direction of the main elongate floating structure and extending within the longitudinal length of the main elongate floating structure while passing through the first point of the top face;
connection beams connecting both opposing first and second ends of the transverse beam and both opposing first and second ends of the longitudinal beam respectively;
auxiliary pillars vertically extending through the first and second ends of the transverse beam and the first and second ends of the longitudinal beam respectively;
solar-based energy generation devices disposed at top ends of the auxiliary pillars respectively;
auxiliary elongate floating structures disposed at bottom ends of the auxiliary pillars passing through the first and second ends of the transverse beam; and
connectors coupled to rear and front ends of the main elongate floating structure respectively,
wherein the plurality of the floating ships are connected in series to each other via the connectors to allow the renewable power generation farm for fishing work to act as a defense floating barrier to protect the sea surface from illegal invasion,
wherein the farm further comprising:
a vertical propeller type wind power generator provided at the upper end of each of the auxiliary pillars, wherein the vertical propeller type wind power generator includes a rotation drum having a fixed flange at each of the upper and lower ends thereof, and inclined rotary vanes provided on an outer surface of the rotation drum,
wherein the connection beams together forms a rhombus shape, wherein the transverse beam is longer than the longitudinal beam,
wherein the auxiliary elongate floating structure is embodied as a floating-force generation body that has a sealed void space defined therein or is filled with a foam;
wherein the mutually coupled connection bars is reinforced in terms of the coupling force therebetween using a chain;
wherein the ship further includes:
an inclined condensation unit disposed in an region d below the filtering unit;
a water storage vessel connected to a flow channel for storing the condensed water from the condensation unit;
an air discharge rod having a plurality of discharge holes defined therein; and
a second salt-free air supply device adjacent to the salt-free air supply device, wherein the air outlet tube of the salt-free air supply device and an air outlet tube of the second salt-free air supply device are connected to each other, wherein through a connector pipe, the evaporation region of the salt-free air supply device is connected to a filtering unit of the second salt-free air supply device,
wherein the farm further comprises:
an electrical charging unit disposed on the main elongate floating structure to charge a battery; and
a battery-carrying ship to carry the charged battery.

3. A renewable power generation farm for fishing work floating on a sea surface, the farm comprising:
a plurality of floating ships, wherein each ship is configured to generate an energy using solar and wind power, wherein each ship comprises:
a main elongate floating structure having a top face;
a wind-based energy generation device secured to the main elongate floating structure via a vertical support pillar fixed to a first point of the top face of the main elongate floating structure;
a transverse beam extending perpendicularly to a longitudinal direction of the main elongate floating structure and extending beyond lateral edges of the main elongate floating structure while passing through the first point of the top face;
a longitudinal beam extending in a parallel manner to the longitudinal direction of the main elongate floating structure and extending within the longitudinal length of the main elongate floating structure while passing through the first point of the top face;

connection beams connecting both opposing first and second ends of the transverse beam and both opposing first and second ends of the longitudinal beam respectively;

auxiliary pillars vertically extending through the first and second ends of the transverse beam and the first and second ends of the longitudinal beam respectively;

solar-based energy generation devices disposed at top ends of the auxiliary pillars respectively;

auxiliary elongate floating structures disposed at bottom ends of the auxiliary pillars passing through the first and second ends of the transverse beam; and connectors coupled to rear and front ends of the main elongate floating structure respectively, wherein the plurality of the floating ships are connected in series to each other via the connectors to allow the renewable power generation farm for fishing work to act as a defense floating barrier to protect the sea surface from illegal invasion, wherein the wind-based energy generation device is disposed between the solar-based energy generation device and the top face of the structure, wherein the wind-based energy generation device includes a rotation drum through which the support pillar passes, and blades outwardly extending from the rotation drum, wherein the rotation drum includes:

a vertical rotatable body with a hollow central region through which the support pillar pass;

upper and lower fixing flanges extending horizontally outwardly from upper and lower ends of the vertical rotatable body respectively; and spaced inclined portions protruding outwardly from an outer surface of the vertical rotatable body between the upper and lower flanges, wherein the blades are arranged in a circumferential direction at predetermined equal intervals, and each blade is embodied as a curved plate, and a wind guide space is defined between adjacent blades, wherein the ship further comprises:

a further transverse beam corresponding to the transverse beam, wherein the further transverse beam is disposed between the rotation drum and the solar-based energy generation device;

a further longitudinal beam corresponding to the longitudinal beam, wherein the further beam is disposed between the rotation drum and the solar-based energy generation device; and further connection beams respectively corresponding to the connection beams, wherein the further connection beam is disposed between the rotation drum and the solar-based energy generation device.

4. The farm of claim 1, further comprising:

a vertical propeller type wind power generator provided at the upper end of each of the auxiliary pillars, wherein the vertical propeller type wind power generator includes a rotation drum having a fixed flange at each of the upper and lower ends thereof, and inclined rotary vanes provided on an outer surface of the rotation drum, wherein the connection beams together forms a rhombus shape, wherein the transverse beam is longer than the longitudinal beam, wherein the auxiliary elongate floating structure is embodied as a floating-force generation body that has a sealed void space defined therein or is filled with a foam;

wherein the mutually coupled connection bars is reinforced in terms of the coupling force therebetween using a chain;

wherein the ship further includes:

an inclined condensation unit disposed in an region d below the filtering unit;

a water storage vessel connected to a flow channel for storing the condensed water from the condensation unit;

an air discharge rod having a plurality of discharge holes defined therein; and a second salt-free air supply device adjacent to the salt-free air supply device, wherein the air outlet tube of the salt-free air supply device and an air outlet tube of the second salt-free air supply device are connected to each other, wherein through a connector pipe, the evaporation region of the salt-free air supply device is connected to a filtering unit of the second salt-free air supply device, wherein the farm further comprises:

an electrical charging unit disposed on the main elongate floating structure to charge a battery; and a battery-carrying ship to carry the charged battery.

5. The farm of claim 1, wherein the wind-based energy generation device is disposed between the solar-based energy generation device and the top face of the structure, wherein the wind-based energy generation device includes a rotation drum through which the support pillar passes, and blades outwardly extending from the rotation drum, wherein the rotation drum includes:

a vertical rotatable body with a hollow central region through which the support pillar pass;

upper and lower fixing flanges extending horizontally outwardly from upper and lower ends of the vertical rotatable body respectively; and spaced inclined portions protruding outwardly from an outer surface of the vertical rotatable body between the upper and lower flanges, wherein the blades are arranged in a circumferential direction at predetermined equal intervals, and each blade is embodied as a curved plate, and a wind guide space is defined between adjacent blades, wherein the ship further comprises:

a further transverse beam corresponding to the transverse beam, wherein the further transverse beam is disposed between the rotation drum and the solar-based energy generation device;

a further longitudinal beam corresponding to the longitudinal beam, wherein the further beam is disposed between the rotation drum and the solar-based energy generation device; and further connection beams respectively corresponding to the connection beams, wherein the further connection beam is disposed between the rotation drum and the solar-based energy generation device.

* * * * *